May 15, 1973 W. F. BURNS 3,733,272
CIRCULAR FLOTATION SYSTEM
Filed July 16, 1971 3 Sheets-Sheet 2
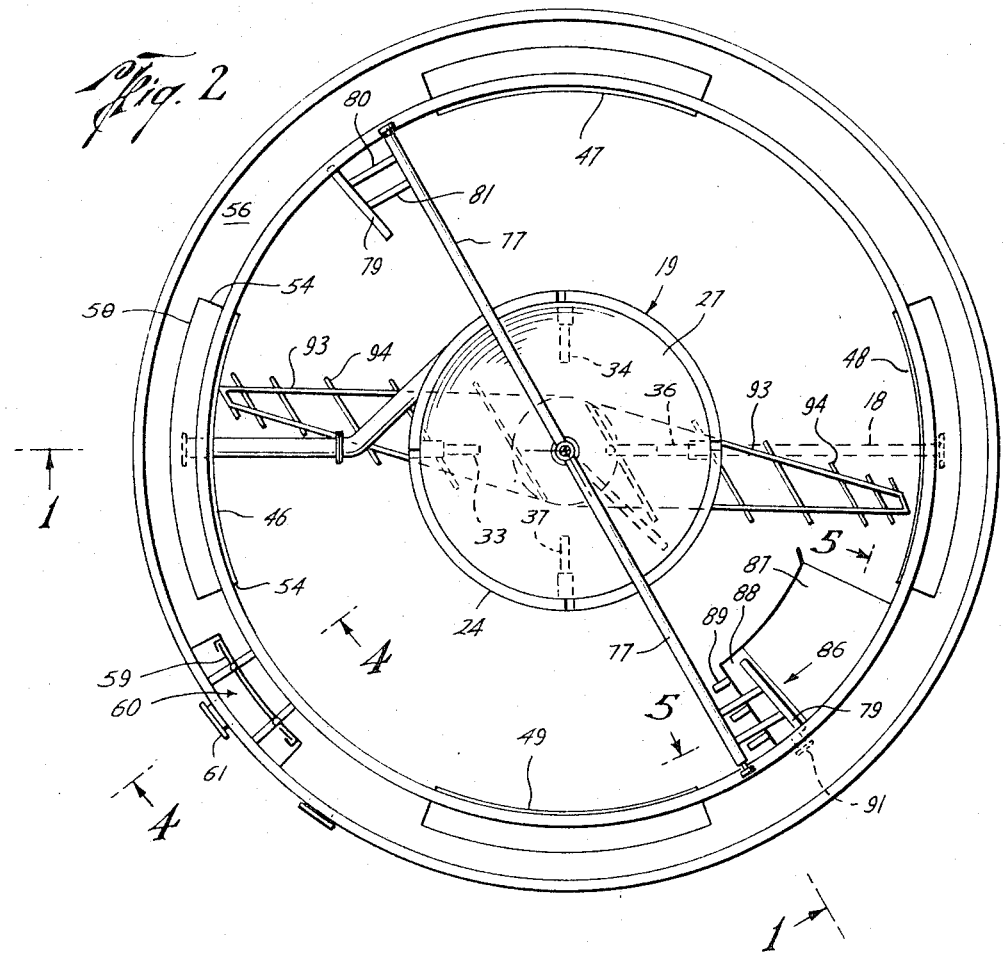
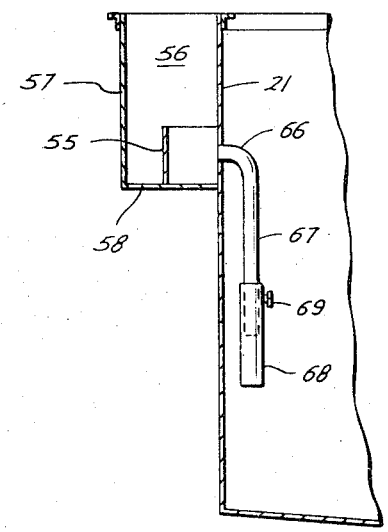
William F. Burns
INVENTOR
BY Emil J. Bednar
ATTORNEY

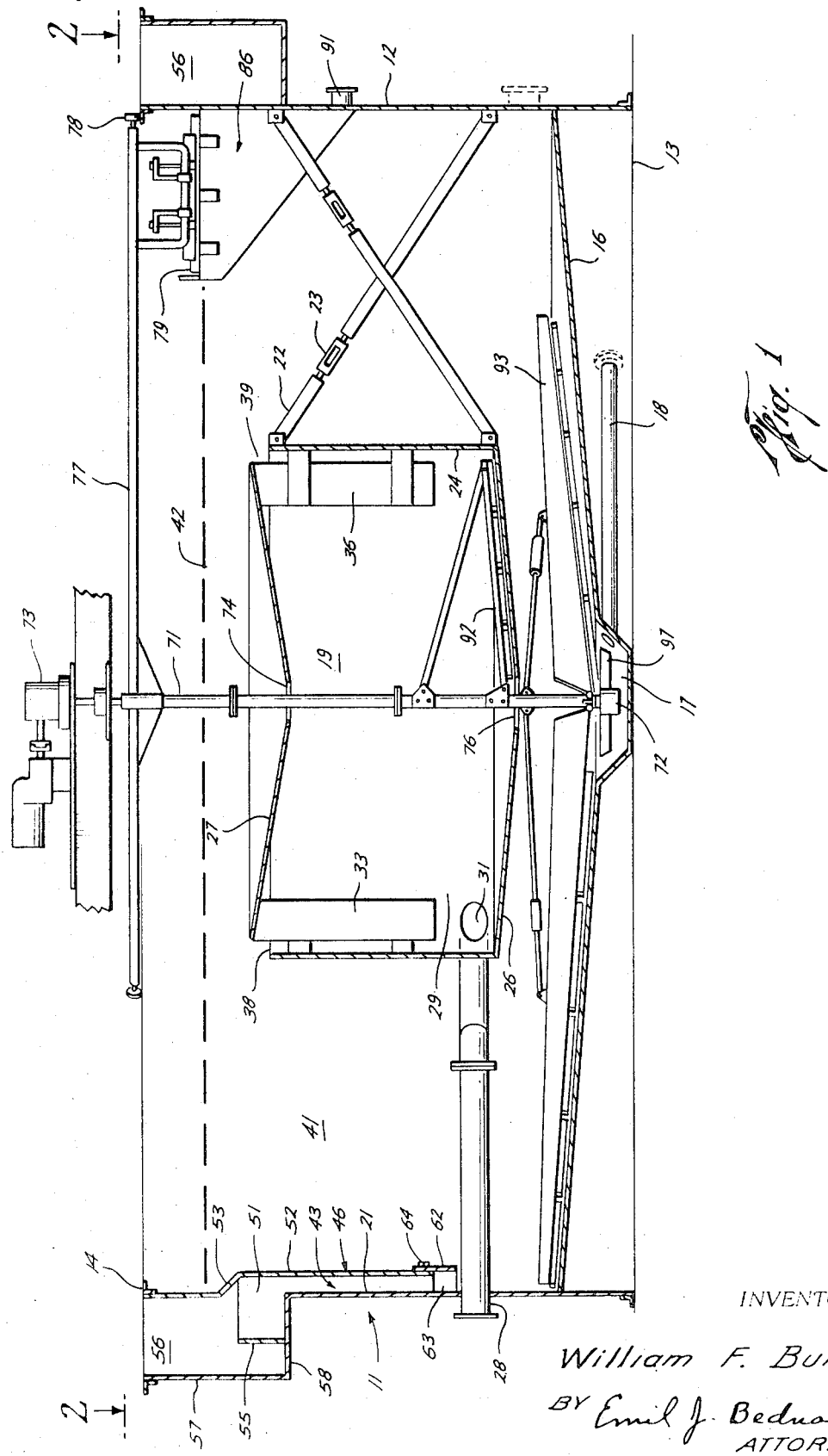

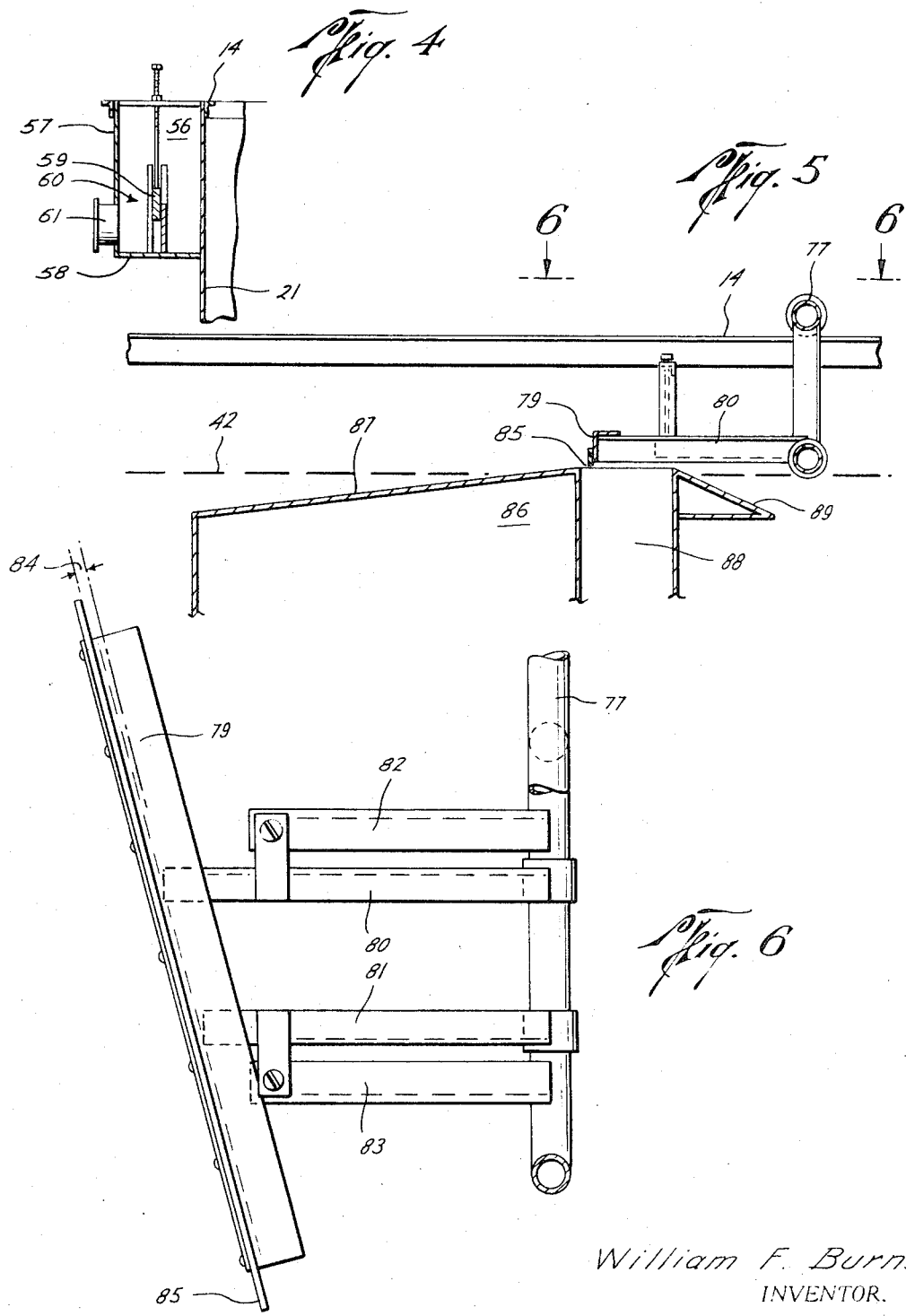

3,733,272
CIRCULAR FLOTATION SYSTEM
William F. Burns, Houston, Tex., assignor to Petrolite Corporation, St. Louis, Mo.
Filed July 16, 1971, Ser. No. 163,193
Int. Cl. B01d 19/00; B03b 1/00
U.S. Cl. 210—221       12 Claims

ABSTRACT OF THE DISCLOSURE

A flotation system for removing suspended material from a liquid in a circular vessel with a vertical axis. An upright cylindrical inlet chamber resides centrally on the vessel and receives in a mixing zone in its lower portion the liquid containing dissolved flotation gas through a horizontal tangential inlet. Vertical vones above the mixing zone direct the circulation liquid into a radial and linear flow rising upwardly in the inlet chamber. An inverted conical cover supported by the vanes provides an unbroken annular nozzle to direct liquid flow from the inlet chamber in a path forming an acute angle with the top of the vessel. Circumferential liquid outlets on the vessel remove the clarified liquid adjacent the sidewall at a certain selected horizon. Accumulated floating deposits and settled solids are removed through suitable outlets from the vessel.

BACKGROUND OF THE INVENTION (1) Field of the invention

This invention relates to liquid purification, and more particularly, it relates to the separation of suspended solids from a liquid by dissolved air flotation.

(2) Description of the prior art

There are many instances when it is desired to remove suspended materials from a liquid, such as water, for purification or other purposes. For example, suspended sand and oil particles can interfere with the subsequent utilization of the water. Many procedures have been proposed for removing these suspended materials from water. One of the most successful procedures for the separation of suspended materials from water is by dissolved-air flotation techniques. For this purpose, the water may be intermixed directly with air, so that air dissolves into the water at several times atmospheric pressure. Then, the dissolved air-water mixture is introduced into a flotation vessel wherein the liquid returns to substantially atmospheric pressure. This results in the dissolved air being released from solutions to form an infinite number of tiny bubbles. As these bubbles rise to the surface of the water, they attach themselves to the suspended material, both solids and entrained liquids such as oil, and carry these materials to the surface of the water where they are removed by suitable skimming devices. The clarified water is removed by a suitable outlet from the flotation cell. Solids which settle from the water during the flotation technique are usually removed from the lower portions of the flotation cell through the use of scrapers and sludge withdrawal mechanisms. In many cases various chemicals, such as the polyacrylic-polyelectrolytes, are intermixed with the water to cause a flocculation reaction simultaneous with the formation of the tiny bubbles from the dissolved air in the flotation cell. Where this simultaneous technique is employed, there is a problem with efficiently carrying out simultaneously both suspended-material, removal techniques in the flotation cell.

Dissolved-air flotation requires a substantially quiescent-liquid system with minimum turbulence and maximum residence time so the the air may remove the suspended materials from the water. In contrast, the chemical flocculation requires a short period of controlled mixing in which the floc begins to form by the reaction of the chemical agent and the suspended material. Thereafter, the initially formed floc must be permitted to enter a quiescent liquid system for the floc to grow to sufficient sizes for removing efficiently suspended materials from the water. The flock may be sufficiently buoyant to rise to the surface of the water along with the materials removed by dissolved-air flotation. In other instances, the floc may be sufficiently dense to settle to the lower portion of the flotation cell in the same manner as certain solids removed during the air flotation technique.

In carrying out the above procedures for removing suspended materials from water, the flotation cell, for optimum efficiency, should provide the longest flow path in the quiescent region for the water in the dissolved-air flotation technique. The flow of water under such conditions must not pass from the quiescent zone through any region subject to shearing effects nor at such velocities as to either roil the surface of the water or to cause circulating fluid mixing and thereby disrupt the air flotation removal of suspended material from the water. Similar problems exist with the flocculation reaction provided by the chemical agent added to the liquid. A certain amount of mixing is required for proper floc formation. This mixing must be under controlled conditions of turbulent flows with a subsequent conversion into the quiescent linear flows for proper flocculation effects. Once the flocculation effects begin to occur, the flocculation techniques can be subject to the same process criterion as the dissolved-air flotation technique.

In conducting combined dissolved air and flocculation techniques many prior art devices employ an inlet chamber in the flotation cell that is segregated from the quiescent region where the ultimate dissolved air and flocculation removal of suspended materials from the water occurs. The inlet chamber should not be of a great volume so as to substantially reduce the capacity of the flotation cell and the residence time to the water as it approaches the clarified water outlets. Otherwise, the ultimate degree in removal of the suspended material from the water in the flotation cell is reduced. The flotation cell also must operate continuously and without requiring frequent or undesired shut-downs for cleaning out accumulated sludge, solids and other suspended materials removed from the water phase.

Therefore, it is the purpose of the present invention to provide a flotation system for removing suspended materials from a liquid, such as waste water, which is capable of meeting all the above design criterion while avoiding the problems associated with the many devices found in the prior art.

SUMMARY OF THE INVENTION

In accordance with the present invention, there is provided a flotation system for removing suspended materials from a liquid comprising the following elements. A circular vessel is mounted with its axis vertical and carries an upright cylindrical chamber which is spaced from the sidewall, bottom and top extremities of the vessel. The liquid carrying suspended material is introduced into the inlet chamber through a horizontal inlet means. The inlet means provides a tangential introduction of the liquid into a mixing zone within the lower portion of the inlet chamber and therein circulated in the presence of a gas at least partially in solution in the liquid. Flow straightening means in the inlet chamber above the mixing zone receive the circulating liquid flow from the mixing zone and provide a radial and linear flow of the liquid upwardly in the inlet chamber. Above the flow straightening means, a conical cover is carried apex downwardly in spaced relationship to the inlet chamber's sidewall to provide a substantially unbroken annular discharge nozzle. This nozzle directs liquid from the inlet chamber to flow in a radial and linear direction in a path forming an acute angle with the top extremity of the vessel. Clarified liquid outlet means carried about the circumference of the vessel provide for the removal of liquid from adjacent the sidewall of the vessel and at a horizon vertically spaced intermediate the bottom and top extremities of the vessel. If desired, additional element features may be associated with the foregoing elements to provide additional structural operational advantages to the present system.

DESCRIPTION OF THE DRAWINGS

FIG. 1 is a vertical section of a circular flotation system of the present invention illustrating the placement and construction of various elements, and the section is taken on line 1—1 of FIG. 2;

FIG. 2 is a plan view of the flotation system of FIG. 1 taken on line 2—2;

FIG. 3 is a partial vertical section of the upper-left portion of FIG. 1 illustrating an alternative water outlet arrangement;

FIG. 4 is a vertical section illustrating a weir for regulating water levels in the flotation system of FIG. 1;

FIG. 5 is an enlarged vertical section of a float arm and float outlet taken on line 5—5 of FIG. 2; and FIG. 6 is an enlarged plan view of the float arm from a line 6—6 of FIG. 5.

DESCRIPTION OF SPECIFIC EMBODIMENTS

Referring now to FIGS. 1 and 2 of the drawings, there is shown a flotation system 11 of the present invention for removing suspended materials from a liquid, such as water. The flotation system 11 includes a circular vessel 12 which is mounted with its axis vertical upon a suitable base 13 which may take the form of a concrete pedestal. The vessel 12 is preferably of steel and may be a section of a right cylinder. The vessel 12 has a planer top-wall surface 14 and a conical bottom 16 mounted with its apex pointed downwardly into a sump 17 connected as part of a solids outlet removal means. The solids are removed from the sump 17 through a solids outlet conduit 18 and then passed to any suitable ultimate disposal. The conical bottom 16 may have any suitable slope to carry solids downwardly toward the sump 17 but preferably has a fall of between one inch and three inches per foot in the flotation system 11.

An upright cylindrical chamber 19 is mounted within the vessel 12 and is spaced from the sidewall 21, top-wall surface 14 and conical bottom 16 by a plurality of supporting rods 22 carrying turnbuckles 23. Adjustment of the turnbuckles 23 tension the rods 22 so that the inlet chamber 19 may be positioned coaxially in the vessel 12 and in vertical spaced relationship to the top-wall surface 14 and the conical bottom 16. Although the mounting of the inlet chamber 19 to the vessel 12 has been described by a particular arrangement of rods 22 and turnbuckles 23, it will be apparent that other means of mounting these elements together may be employed if desired.

The inlet chamber 19 is formed preferably of steel and has a cylindrical enclosing sidewall 24, a bottom 26 and a conical top 27 which is mounted with its apex pointed downwardly. Although the bottom 26 may take any configuration, it is best for solids removal purposes that it have a conical configuration and orientation like the top 27. The volume of the inlet chamber 19, in the present construction of the flotation system 11, may reside between about one-thirtieth and about one-fifth the total volume of the vessel 12. Preferably, the volume of the inlet chamber 19 relative to the vessel 12 is between one-tenth and one-fifth. Stated in another manner, the volumetric relationship between the inlet chamber 19 and the vessel 12 provides a range of residence time ratios of the liquids within the inlet chamber 19 and the vessel 12 between one to thirty and one to five. Residence time ratios above and below these limits may be employed but usually will be found not to be of advantage or else are economically unacceptable. Satisfactory results are obtained readily with ratios intermediate these ratio limits.

The liquid to be treated within the flotation system 11 is introduced from any pressured source (not shown) into the inlet chamber 19 through an inlet conduit 28 which traverses the sidewall 21 and passes horizontally into the lower portion 29 of the inlet chamber 19 by a tangential entry 31. The entry 31 may connect with any horizon of the lower portion 29 of the inlet chamber 19. It is preferable that entry 31 resides immediately adjacent the conical bottom 26. This tangential introduction of liquid horizontally into the inlet chamber 19 is of special importance since it results in a circulating (turbulent) flow within the lower portion 29 of the inlet chamber 19. The portion 29 provides a mixing zone wherein the incoming liquid is commingled with the gas being released from solution of the liquid and any chemicals for creating flocculation, etc. The intermingling flow of liquid within the mixing zone causes a gentle intermixing of the various liquid, air, and chemical agents.

For providing the proper mixing within the lower portion 29 of the inlet chamber 19, the vertical dimension of the lower portion 29 which comprises the mixing zone for optimum results may be adjusted relative to the incoming mass and velocity of incoming liquid at the tangential entry 31. The height of the lower portion 29 compared to the diameter of the inlet chamber 19, for any given incoming flow velocity at the tangential entry 31, is not excessively critical in the flotation system 11 which will operate effectively over a broad range of incoming liquid flow rates. Preferably, the height of the lower portion 29 is not over one-fourth of the total height of the sidewall 24 of the inlet chamber 19. Obviously, other dimensional relationships between the heights of the lower portion 29 and the inlet chamber 19 may be employed with good results.

The liquid entering the inlet conduit 28 usually will be passed through an air saturation system in which the liquid is contacted with air, or other saturating gas, at several atmospheres pressure. The solution, at least in part, of the gas in the liquid is obtained. However, it is envisioned that a side stream of the same or different liquid may be saturated with gas and introduced into the inlet chamber 19 either by intermixing with the incoming liquid in inlet conduit 28 or by separate introduction into the inlet chamber 19 through a supplemental inlet conduit. For example, a clarified liquid portion from the flotation system 11 may be saturated with dissolved gas externally of the vessel 12 and re-introduced in a recycling flow through the inlet conduit 28.

The circulating flow from the tangential entry 31 produces a circulating flow which has its highest velocity (and greatest fluid pressure) adjacent the sidewall 24. The flow velocity (and fluid pressure) progressively decreases at points radially closer the center of the inlet chamber 19. Thus, the central portion of the inlet chamber 19 contains a relatively slow-moving circulating flow of the liquid with the largest amount of air being released from solution.

A means for straightening the flow of circulating liquid from the lower portion 29 resides in the upper portion 32 of the inlet chamber 19. For example, a plurality of vertical vanes 33, 34, 36 and 37 can be mounted to the interior of the sidewall 24. These vanes may be supported by brackets welded to the vanes and sidewall 24. Preferably, the vanes are mounted in a uniform spacing about the circumference of the inlet chamber 19 and extend toward the center or vertical axis of the inlet chamber 19. Good results are obtained when these vanes extend radially inwardly from the sidewall 24 a distance less than one-half the radius of the inlet chamber 19. The vanes need not extend radially more than a distance of one-fifth the radius of the inlet chamber 19 for acceptable results. The vanes need have vertical and radial dimensions only to straighten the high velocity portion of the circulating flow of the liquid adjacent the sidewall 24 upon the liquid rising in the inlet chamber 19. The vanes extend for the remaining height of the inlet chamber 19 above the lower portion 29. Preferably, the vanes extend a short distance above the upper top wall surface 38 to support the conical top 27. This particular arrangement of the vanes supporting the top 27 provides a substantially unbroken annular discharge nozzle 39 circumferentially above the top-wall surface 38 of the inlet chamber 19.

The incoming liquid from the tangential entry 31 is passed in a circulating flow within the lower portion 29. There the resultant mixing of any chemical aids for flocculation and pressure reduction release a multitude of very small bubbles of the dissolved gas from solution. The liquid then rises upwardly from the mixing zone and through contact with the vanes is converted from a circulating high-velocity and turbulent flow into a flow characterized as radial and linear. This liquid flow moves, upon passage from the annular nozzle 39, in a direction on a path forming an acute angle with the top wall surface 14 of the vessel 12. Thus, the liquid leaves the inlet chamber 19 and enters the main separation zone 41 of the vessel 12 under the best quiescent flow conditions for dissolved air floatation and simultaneous chemical flocculation for the efficient removal of suspended liquids and solids from the liquid. The conical top 27 of the inlet chamber 19 provides a "nozzle" function for introducing the liquid into the main settling region of the vessel 12 without roiling the surface of the liquid above the inlet chamber 19. In addition, the vanes convert the circulating flow of the liquid adjacent the sidewall 24 of the inlet chamber 19 into a radial and linear flow. The central portion of the inlet chamber 19 within the vanes has a relatively small circulating flow velocity and therein, the amount of shear induced upon the liquid by the action of the vanes is reduced to a bare minimum. The less dense floc resides in this central portion. Thus, there is no substantial disruption of any chemical flow forming in the liquid, or like disruption of the dissolved-air flotation process, initiated within the central portion of the inlet chamber 19.

The liquid entering the main separation zone 41 of the vessel 12 has radial and linear directional flow characteristics. Thus, optimum conditions exist whereby the multitude of small bubbles passing upwardly through the liquid can remove a substantial portion of the suspended floc, liquids and solids from the liquid. A large portion of the more dense solids may gravitationally separate from the liquid in the main separation zone 41. These solids accumulate upon the conical bottom 16 of the vessel 12. The air-floatable materials, both solids and liquids, rise upwardly to the upper surface 42 of the liquid.

The liquid moves through the main separation zone 41 in a radial path toward a plurality of clarified water outlets 43 carried about the circumference of the vessel 12. The outlets 43 remove clarified liquid from adjacent the sidewall 21 and at a horizon vertically spaced intermediate top wall surface 14 and the bottom 16 of the vessel 12. The clarified water outlets 43 may take any suitable form. Preferably, the clarified liquid is removed at several points spaced equidistantly along the circumference of the sidewall 21. For this purpose, the clarified water outlets 43 may take the form of flumes 46, 47, 48 and 49 equally spaced about the sidewall 21. The outlet flumes, like flumes 46, are provided by openings 51 through the sidewall 21 with a circumferential skirt parallel to the sidewall 21 extending from the opening 51 downwardly to the certain horizon from which the clarified liquid is to be removed from the main separation zone 41. The upper portion of the skirt 52 is dressed by a fillet 53 to the sidewall 21. The ends 54 of the fillet 53 are returned through the sidewall 21 and closed by an annular wall 55. Thus, there is provided an enclosed downwardly extending passageway between the opening 51 and the lower terminus of the skirt 52 opening onto the main separation zone 41. Exteriorly of the opening 51, an annular box 56 is formed by a circumferential sidewall 57 and bottom 58 returned to the sidewall 21. Water is removed from the box 56 through the clarified water outlet conduit 61 to a subsequent utilization. Referring momentarily to FIG. 4, an annular vertically adjustable baffle 59 forms one side in an outlet box 60 discharged through the conduit 61. The baffle 59 acts as a weir to set the height of the water within the box 60 and the main separation zone 41 of the vessel 12.

In the present circular flotation system 11, a preferred arrangement of the outlets 43 allows selection of the horizon from which the clarified liquid is removed from the main separation zone 41. For this purpose, the lower terminus of the flumes is made moveable vertically relative to the vessel 12. Any suitable arrangement may be employed for this purpose. In the construction illustrated in FIG. 1, the vertical adjustment feature is provided by a close-fitting telescoped extension skirt 62 on the skirt 52. The extension skirt 62 carries ends 63 which return in a sliding seal on the sidewall 21. The extension skirt 62 is secured releasably to the skirt 52 by any means, such as bolt 64. The bolt 64 may be released and the extension skirt moved vertically to place the lower opening at a certain horizon. Then, the bolt is tightened to secure extension skirt 62 at the particular vertical positioning.

The vertical movement arrangement of skirt 62 can be made operative from the exterior of the vessel 12. Adjustment of the lower open end of the flumes at a certain horizon towards the upper portion of the vessel 12. In other ple, maximum removal of suspended materials in certain liquid treatments to remove heavy solids occurs at a horizon towards the upper portion of the vessel 12. In other operations, where light oils or flocs are removed, the best result is obtained at some horizon closely adjacent the bottom 16. Thus, the extension skirt 62 can be moved vertically to select the particular horizon at which the clarified water is least contaminated by residual suspended materials not removed completely by operation of the flotation system 11.

With momentary attention to FIG. 3, there is shown another embodiment of the useable clarified water outlet for the vessel 12. In this arrangement, an elbow 66 is mounted upon the sidewall 21 adjacent the bottom 58 of the box 56. A pipe 67 is carried on the lower end of the elbow 66. Over the lower end of the pipe 67 is telescoped a second pipe 68. The pipes 67 and 68 may have a sufficiently tight fit that they may be telescoped manually as desired and then are retained by frictional engagement in that position without auxiliary clamping mechanisms. However, a pipe clamp 69 may be employed to maintain the selected position of the pipe 68. The certain horizon for removal of the clarified liquid from the zone 41 may be readily selected by this arrangement.

Returning now to FIGS. 1 and 2, the flotation system 11 carries means for removing the air-floated deposits from the upper surface 42 of the liquid in the vessel 12 and any solids which accumulate within the inlet chamber 19 or upon the conical bottom 16. For this purpose, a vertical drive shaft 71 is carried in a lower bearing support 72. A superimposed motor drive and gear assembly 73 rotate the shaft 71 at a suitable speed, e.g., 1 r.p.m. The shaft 71 passes through apertures 74 and 76 within the conical top 27 and bottom 26, respectively. The clearance of the shaft 71 within these apertures need not be more than one or two inches. Greater amounts of clearance merely result in bypassing through the apertures 74 and 76 the flow of liquid from the annular nozzle 39. A substantially horizontally extending elongated float arm 77 is carried on the shaft 71 in alignment with the topwall surface 14 of the vessel 12. The arm 77 extends radially outwardly to a journaled roller 78 riding upon the topwall surface 14 of the vessel 12. Rotation of the shaft 71 drives the arm 77 about the circumference of the vessel 12 in a horizontal plane.

As best seen in FIGS. 5 and 6, pivoted blade 79 is secured to the arm 77 by parallel supports 80 and 81 which are journaled to the arm 77 by sleeves to a U-shaped mount. The pivotal mounting is arranged by mechanical stops 82 and 83 so that the blade 79 can be deflected vertically upwardly from a lower set position. In the lower position, the blade 79 is immersed partially within the upper surface 42 of the liquid in the vessel 12. The blade 79 extends only a small portion of the radius of the vessel 12 to remove the accumulated deposits resting on the upper surface 42 of the liquid. The reason for this result is that the movement of the liquid from the inlet chamber 19 towards the outlet flumes 46–49 is such as to cause the floating deposits to collect adjacent the sidewall 21 of the vessel 12. Preferably, the blade 79 carries a Teflon® wiper 85 for low friction wiping action. The blade 79 rotates about the vessel 12 to gather before it the accumulated deposits near the sidewall 21. This skimming function can be further improved by canting the blade 79 to form an acute angle to the rear of the direction of travel of a radial line passing through the inward edge of blade 79. This cant angle is indicated by the numeral 84. The arm 77 moves the accumulated deposits towards one or more collection boxes 86 which are mounted inwardly on the sidewall 21 of the vessel 12.

The collection box 86 may have any suitable configuration but preferably is provided with a beach plate formed with a sloped imperforate face 87 presented in the direction of approach by the blade 79. The face is only partially covered by the liquid surface 42. Thus, the blade is raised relatively slowly from the surface 42 of the liquid in the vessel 12. This permits a relatively slow disengagement of the liquid from the deposits. The blade 79 can be raised solely by its contact with the sloping face 87. The collection box 86 has an intermediate discharge sump 88 over which the blade 79 passes. The deposits accumulating before the blade fall by gravity into the sump 88. The blade 79 is in its upper pivoted position above the sump 88. Leaving the sump 88, the blade 79 returns on reversed sloped face 89 to its lower pivoted position where it again penetrates the surface 42 of the liquid in the vessel 12. Preferably, the face 89 is provided by a plurality of wedge-shaped elements to reduce the wear on the blade 79. In addition, these wedged-shaped elements break any viscous film created between the blade 79 and the sump 88 during discharge of the accumulated deposits. The sump 88 is connected to a float outlet conduit 91 from which the deposits can be passed to any subsequent disposal or utilization. For example, these materials may be sent to an oil recovery unit or incinerator.

Returning to FIGS. 1 and 2, a bottom scraper 92 is carried on the shaft 71 in close proximity to the conical bottom 26 of the inlet chamber 19. The bottom scraper 92 may be a single arm device of simple construction. This device is required merely to move any accumulated solids from the corner between the conical bottom 26 and the sidewall 24 of the inlet chamber 19. The circulating flow from the tangential entry 31, in cooperation with the bottom scraper 92, prevents any significant accumulations of solids upon the conical bottom 26. Removal of these solids may be important in food-waste streams. There are some installations relatively free of solids, or for other reasons, where the scraper 92 may be omitted.

A bottom scraper 93 may be carried on the lower portion of the shaft 71. The bottom scraper 93 is mounted on the shaft 71 in a fixed position by suitable locking supports. The scraper 93 should pass in close proximity to, but preferably does not touch, the conical bottom 16 of the vessel 12. The scraper 93 is carried upon an arm assembly formed of angle-iron supports in a lattice arrangement. The scraper 93 carries a plurality of inclined scraper blades 94 canted outwardly in the direction of rotation. As a result, solids accumulating on the conical bottom 16 are moved radially inwardly towards the sump 17. These solids eventually accumulate within the sump 17 and are removed through the solids outlet conduit 18. If desired, an impeller 97 may be carried on the lower extremity of the shaft 71 to agitate the solids in the sump 17 to a sufficient fluid-state for ready removal through the solids outlet conduit 18. It will be apparent that other arrangements for providing the bottom scraper 93 in the vessel 12 may be employed. The particular construction of this feature is not critical to the operation of the flotation system 11. Where the bottom-accumulating solids are not great in amount, or for other reasons, the scraper 93 may be omitted.

The flotation system 11 operates in the following manner. From a suitable external source, the waste water carrying the suspended material is passed at elevated pressure, e.g., 20–100 p.s.i., through a retension tank or the like, whereby a substantial quantity of air is received into solution. This air-saturated waste water flows through the inlet conduit 21 and the tangential entry 31 into the lower portion 29 of the inlet chamber 19. At this point, the circular movement of the waste water produces a thorough mixing function by near turbulent flow conditions. The liquid pressure reduces to the hydrostatic head within the inlet chamber 19 and thereby creates a multitude of small air bubbles. If a chemical flocculating agent is present, a floc begins to form for removing certain types of suspended materials. The circulating water then rises in the inlet chamber 19 from the lower portion 29 into the upper portion 32 into contact with the vanes 33 through 36. As a result, the circulating flow is converted into radial and linear flow in the water which passes outwardly through the annular nozzle 39 into the main separation zone 41. In the main separation zone 41, the water is freed of the suspended materials by dissolved-air flotation and flocculation procedures. Solid materials also can gravitate downwardly to the bottom 16 of the vessel 12. The purified water moves towards the clarified water outlets under radial and laminar flow conditions which produce the ultimate purification obtainable for the clarified water produced in the vessel 12. The clarified water enters the outlet flumes 46 through 49 to collect in the water box 56 and then is removed under controlled level conditions through the box 60 into clarified water outlet conduit 61. The accumulated deposits upon the surface 42 of the liquid in the main separation zone 41 are removed through the rotary action of the blade 79 which deposits them into the sump 88 and ultimate removal through a float outlet conduit 91. Settled solids are moved by the bottom scraper 93 into the sump 17 and then removed through the solids oulet conduit 18. The horizon at which the clarified water is removed through the flumes is adjusted to produce the maximum purification in the clarified water produced by the circular flotation system 11.

Various changes and modifications may be made to the present flotation system which do not depart from the spirit of the invention. It is intended that such variation and changes be encompassed within the appended claims which define the scope of the present invention. The foregoing description is intended to be illustrative of the present invention.

What is claimed is:

1. A flotation system for removing suspended material from a liquid comprising:
   (a) a circular vessel mounted with its axis vertical;
   (b) an upright cylindrical inlet chamber mounted within said vessel and spaced from the sidewall, bottom and top extremities of said vessel, and said chamber having a closed bottom and open top;
   (c) a horizontal inlet means providing a tangential fluid entry into the interior of said inlet chamber adjacent the bottom thereof for introducing a liquid carrying suspended material along the sidewall of said inlet chamber and therein being circulated in a rotary motion and in the presence of a gas at least partially in solution in the liquid, said inlet means introducing the liquid into a mixing zone within the lower portion of said inlet chamber;
   (d) flow straightening means comprising at least one or more vertical vanes mounted upon the interior surface of said sidewall of said inlet chamber above said mixing zone for receiving the circulating liquid flow from said mixing zone and providing a radial and linear flow of the liquid upwardly in said inlet chamber;
   (e) outlet means from the interior of said inlet chamber and in fluid communication with the interior of said circular vessel provided by a conical cover carried apex downwardly with its peripheral edge in spaced relationship above the upper edge of said inlet chamber's sidewall to provide a substantially unbroken annular discharge nozzle for directing liquid from the inlet chamber to flow in a radial and linear direction in a path forming an acute angle with the top extremity of said vessel; and
   (f) clarified liquid outlet means located on the sidewall of said vessel and providing for removal of liquid from adjacent the sidewall of said vessel at a horizon vertically spaced intermediate the bottom and top extremities of said vessel.

2. The flotation system of claim 1 wherein the clarified liquid outlet means are provided with a vertically adjustable extension whereby a certain horizon can be selected for removing liquid from said vessel.

3. The flotation system of claim 1 wherein the volume of said inlet chamber is between a tenth and a fifth the total volume of said vessel.

4. The flotation system of claim 1 wherein said horizontal inlet means introduces the liquid immediately adjacent the bottom of said inlet chamber.

5. The flotation system of claim 1 wherein said flow straightening means comprise a plurality of vertical vanes mounted in uniform spacing about the circumference of said inlet chamber.

6. The flotation system of claim 5 wherein said vanes extend radially inwardly from the sidewall of said inlet chamber a distance less than one-half the radius of said inlet chamber.

7. The flotation system of claim 5 wherein said vanes extend above the sidewall of said inlet chamber and support said conical cover thereby forming said annular discharge nozzle.

8. The flotation system of claim 1 wherein the bottom of said inlet chamber is a conical member mounted apex downwardly.

9. The flotation system of claim 1 wherein said clarified water outlet means comprises a plurality of outlet flumes spaced equidistantly about the circumference of said vessel, and the circumferential dimensions of said flumes being equal to the spacing between said flumes.

10. The flotation system of claim 1 wherein said vessel has a planer top-wall surface and a rotatable vertical drive shaft extends coaxially of said vessel, a substantially horizontal elongated float arm extends from said drive shaft to a journaled roller riding on said top-wall surface of said vessel, a pivoted blade carried on said arm adjacent the sidewall of said vessel whereby said blade deflects vertically between upper and lower positions, and said blade has a skimmer surface forming an acute angle to the rear of the direction of travel of a radial line passing through the inward edge of said blade.

11. The flotation system of claim 10 wherein collection box means are mounted inwardly on the sidewall of said vessel and carrying a beach plate with a sloped imperforate face presented in the direction of approach of said blade for raising said blade toward an upper pivoted position, an intermediate discharge sump to receive accumulated deposits from said blade in said upper position and reverse slope to return said blade to a lower pivoted position.

12. A flotation system for removing suspended material from a liquid comprising:
   (a) a circular vessel mounted with its axis vertical, and said vessel having a planer top-wall surface and a conical bottom carried apex downwardly to terminate at a solids outlet removal means;
   (b) an upright cylindrical inlet chamber mounted within said vessel and spaced from the sidewall, bottom and top extremities of said vessel, said inlet chamber being between about a thirtieth and a fifth the total volume of said vessel, and said inlet chamber having a conical top and a conical bottom both mounted apex downwardly;
   (c) a horizontal inlet means for introducing into said inlet chamber a liquid carrying a suspended material and therein being circulated in the presence of a gas at least partially in solution in the liquid, said inlet means providing a tangential introduction of the liquid immediately adjacent said conical bottom and into a mixing zone with the lower portion of said inlet chamber;
   (d) flow straightening means residing in said inlet chamber above said mixing zone for receiving a circulating liquid flow from said mixing zone and providing a radial and linear flow of the liquid upwardly in said outlet chamber, said flow straightening means comprising a plurality of vertical vanes mounted in uniform spacing about the circumference of said inlet chamber, and said vanes extending radially inwardly from the sidewall of said inlet chamber a distance less than one-half the radius of said inlet chamber, said vanes extending above said inlet chamber's sidewall, and said vanes supporting said conical cover thereby forming a substantially unbroken annular discharge nozzle for directing liquid from said inlet chamber to flow in a radial and linear direction on a path forming an acute angle with the top-wall surface of said vessel;
   (e) clarified liquid outlet means carried about the circumference of said vessel and providing for removal of liquid from adjacent the sidewall of said vessel at a horizon vertically spaced intermediate the bottom and top-wall extremities of said vessel, said outlet means carrying vertically adjustable extensions whereby a certain horizon can be selected for removing liquid from said vessel;
   (f) a vertical drive shaft carried in a bearing support means and rotated by an upper primemover, and said shaft traversing openings formed in the apexes of said conical top and bottom of said inlet chamber;
   (g) a substantially horizontal elongated float arm extending from said drive shaft to a journal roller riding on said top-wall surface of said vessel, a pivoted blade carried on said arm adjacent said sidewall of said vessel whereby said blade deflects vertically between upper and lower positions, and said blade having a skimming surface forming an acute angle to the rear of the direction of travel of a radial line passing through the inward edge of said blade;
   (h) a collection box means mounted inwardly on the sidewall of said vessel and having a beach plate with a sloped imperforate face presented in the direction of approach of said blade for raising said blade toward an upper pivoted position, an intermediate discharge sump to receive accumulated deposits from said blade in said upper position, and a reverse slope to return said blade to a lower pivoted position;

(i) an outlet means connected to said sump on said beach plate means to recover the accumulated deposits;

(j) a sludge scraper means carried on said drive shaft and positioned to pass adjacent the upper surface of said conical bottom of said inlet chamber; and (k) a solids scraper means carried on said drive shaft and positioned to pass adjacent the upper surface of said conical bottom of said vessel, said scraper means having canted blade means whereby solids are moved radially inwardly toward said solids outlet removal means.

References Cited
UNITED STATES PATENTS

| | | | |
|---|---|---|---|
| 2,679,477 | 5/1954 | Kivari et al. | 210—221 X |
| 2,368,354 | 1/1945 | Green | 210—220 X |
| 2,360,812 | 10/1944 | Kelley et al. | 210—13 |

SAMIH N. ZAHARNA, Primary Examiner

T. A. GRANGER, Assistant Examiner

U.S. Cl. X.R.

210—525